March 11, 1958   J. I. DETWEILER ET AL   2,826,437
FLEXIBLE COUPLING FOR RIGID BEADED TUBES
Filed Nov. 30, 1954                                             2 Sheets-Sheet 1
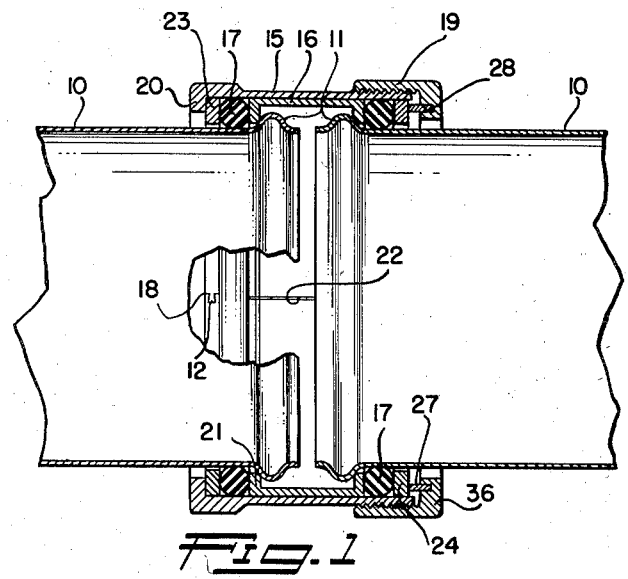
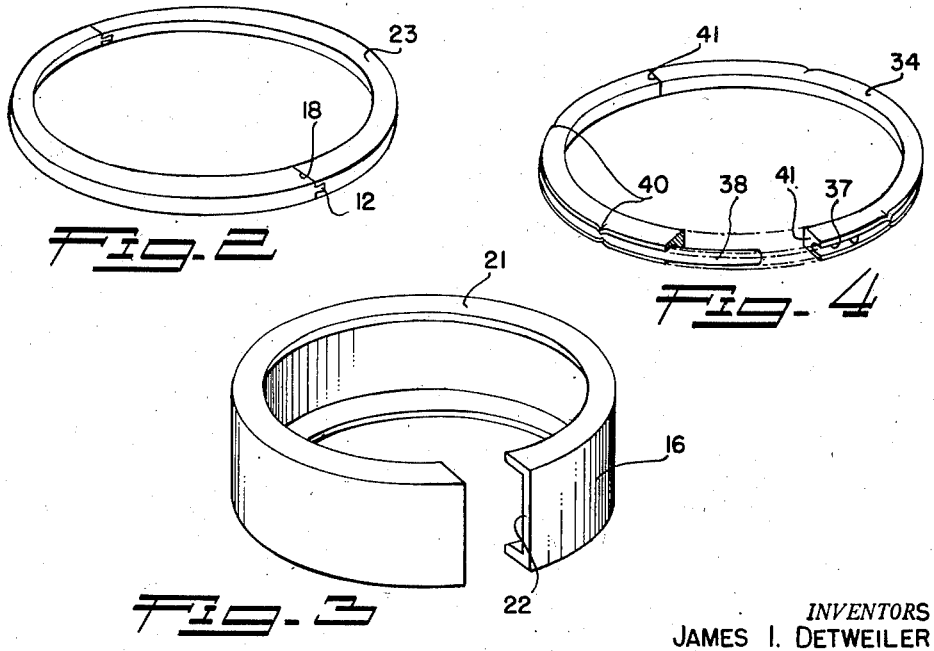
INVENTORS
JAMES I. DETWEILER
DOUGLAS G. THOMPSON
By George C. Sullivan
Agent

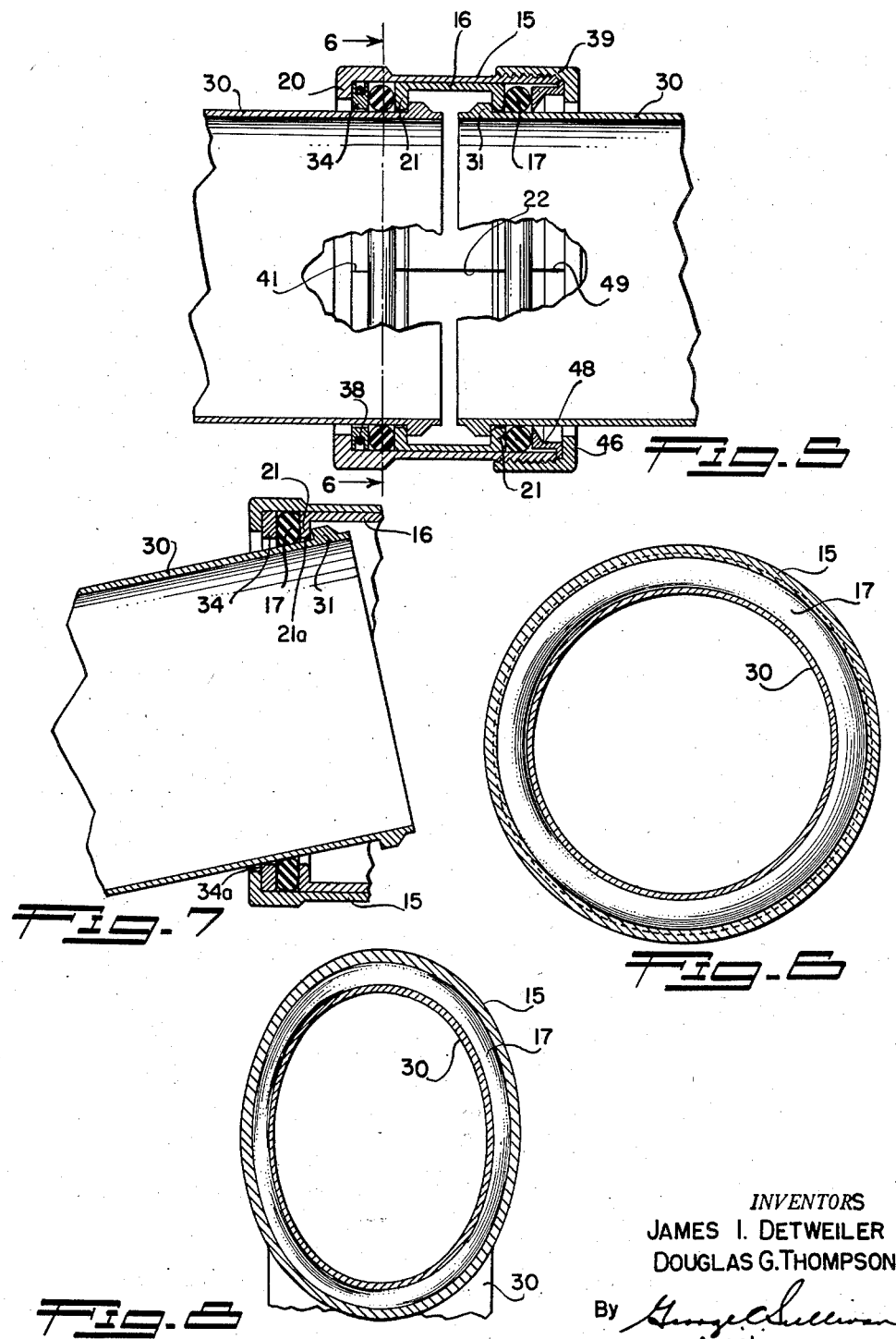

United States Patent Office 2,826,437
Patented Mar. 11, 1958

2,826,437

FLEXIBLE COUPLING FOR RIGID BEADED TUBES

James I. Detweiler, Burbank, and Douglas G. Thompson, Los Angeles, Calif., assignors to Lockheed Aircraft Corporation, Burbank, Calif.

Application November 30, 1954, Serial No. 472,108

1 Claim. (Cl. 285—233)

This invention relates to tube couplings and relates more particularly to couplings for flexibly connecting tubes, pipes, and the like, carrying fluid under pressure.

This application is a continuation in part of application Serial Number 247,858, filed September 22, 1951, said application Serial Number 247,858, now abandoned, being the parent application of divisional application Serial Number 386,766, filed October 19, 1953.

While the invention has a wide range of application it is particularly well adapted for incorporation in coupling devices for connecting the ends of fluid handling pipes or tubes of the class having beads formed adjacent their ends to be engaged by or to cooperate with coupling devices. In connecting such tubes it is necessary to provide and maintain effective seals for preventing leakage of the fluid under pressure while at the same time providing for at least some relative angular or pivotal movement between the tubes. In addition it is, of course, essential to hold the tubes against separation. In the past, difficulty was encountered in providing couplings of this kind, particularly for use with tubes of relatively large diameter carrying fluid at high or substantial pressures. The earlier couplings employed rings of rubber, synthetic rubber, and the like, compressed against the beads of the tubes or against other surfaces by the endwise or axial loads developed by the internal fluid pressures within the tube system, these rings being depended upon to provide the essential fluid seals. In some instances the sealing rings were also compressed or actuated by externally accessible mechanical clamping means. Where the fluid pressure was high and/or where the tubing was large in diameter, the fluid-pressure-developed end loads tending to separate the adjacent tubes were heavy and these high loads or forces applied to and transmitted through the yielding sealing rings soon distorted and extruded the rings to such an extent that they were no longer effective in preventing the leakage of the fluid under pressure.

It is an object of this invention to provide a simple, practical and effective coupling of the character herein referred to that overcomes the shortcomings and difficulties encountered with the couplings heretofore employed.

Another object of the invention is to provide a tube coupling wherein the seal rings are not subjected to the heavy end loads developed by the internal fluid pressures and, therefore, are not excessively distorted or extruded from between the adjacent or confining surfaces. In accordance with our invention the end loads tending to separate the tubes are assumed by and transmitted through a rigid material or metal member which may directly cooperate with the beads on the tubes. Thus the yielding sealing rings are not utilized as elements of the mechanism or system for mechanically connecting the tubes and the rings serve solely as sealing elements. The sealing rings may be actuated by the fluid pressure acting on them through limited annuluses rather than by the fluid pressure acting upon or through the full cross sectional area of the tube or coupling.

Another object of the invention is to provide a coupling of this character in which axial mechanical compression or adjustment, as distinguished from the hydraulic actuation of the sealing rings, may be regulated and obtained as the conditions of intended or initial installation and usage dictate, such regulation of the sealing means being effected independently of the fluid pressure in the tube system. In a preferred embodiment of the invention a simple threaded collar or nut may serve to adjust or regulate the axial mechanical "setting" or compression of the sealing rings. The coupling assembly, including the threaded collar or nut, may be readily applied to tubes having standard or conventional external beads, the coupling being such that it may be easily and quickly assembled around the adjacent ends of the tubes to have the above mentioned load assuming member properly cooperate with beads of the two tubes to assume the heavy end loads.

Another object of the invention is to provide a coupling of the class mentioned that has a small outside diameter to be suitable for installation in confined areas and that is constructed in such a manner that the seal rings and other parts are easily disassembled for inspection and replacement. The couplings may be taken apart with a minimum of effort and are such that the several parts may be passed over the tubing beads and assembled around the tubes, thus permitting "local" assembling and disassembling of the couplings.

It is another object of the invention to provide a coupling that is "flexible" to allow the required limited angular relative movement of the connected tubes, that permits limited axial movement of the tube ends toward one another, as during assembly, and that is unaffected by minor inaccuracies in the lengths of the connected tubes.

A further object of the invention is to provide a coupling of the class described that maintains effective dependable fluid-tight sealing engagement with the connected tubes when applied to or used in connection with either thin walled or thick walled tubes, even in situations where the tubes are moved into and out of the extreme angular relationships and with the fluid in the system at high fluid pressures. In the past difficulty was encountered when the tubes were angularly displaced, one relative to the other, particularly at low temperatures, due to the fact that such displacement of the tubes caused circular or radial deflection of the sealing rings or flattening of the sealing rings which produced either immediate leakage of the fluid or fluid leakage following restoration of the tubes to the aligned or substantially aligned condition. This difficulty was aggravated under low temperature conditions where the sealing rings lost their resiliency to a considerable extent and remained flattened or distorted to the extent they no longer preserved effective seals after the tubes were moved from the extreme angular relative positions to positions where their longitudinal axes were close to the in-line condition. In the couplings of the present invention the tubular coupling body is relatively thin and moderately elastic so that its walls deflect under the above described conditions to the end that the distortion of the sealing rings is substantially the same as when the tubes are more nearly aligned. In other words, the coupling body distorts or flexes in a manner to maintain generally normal compression of the sealing rings even though the tubes are angularly misaligned to the maximum extent. This prevents excessive distortion or squeezing of the sealing rings, thus avoiding leakage of the fluid pressure that would otherwise be occasioned by such flattening or distortion. In cases where the coupling of the invention is employed on tubes having thin flexible walls, the walls of both the coupling body and the tubes are capable of deflecting under the above described conditions in proportion to their relative flexibility, thus preserving a substantially normal and acceptable squeezing or compressing of the sealing rings. In prior couplings of this general class employed on tubes having thin walls, maximum angular relative displacement of the connected tubes often resulted in permanent deformation of one or both tubes in the regions of the sealing rings so that when the connected tubes were subsequently repositioned in alignment, or substantial axial alignment, leakage resulted at said regions.

Other objectives and features of the invention will become apparent from the following detailed description of typical preferred embodiments of the invention throughout which description reference is made to the accompanying drawings wherein:

Figure 1 is a longitudinal detailed sectional view of one form of coupling of the invention applied to adjacent ends of two thin-walled tubes with a portion of one tube broken away to illustrate certain features of the coupling;

Figure 2 is a perspective view of one of the split snap-washers of the coupling;

Figure 3 is a perspective view of the sleeve or load assuming collar of the coupling;

Figure 4 is a perspective view of a split hinged washer of the coupling illustrated in Figure 5, a portion of the washer being broken away to better illustrate the construction thereof;

Figure 5 is a view similar to Figure 1 illustrating another coupling of the invention applied to tubes having thick, or moderately thick walls with portions broken away to better illustrate details of the coupling;

Figure 6 is a transverse sectional view taken as indicated by line 6—6 on Figure 5;

Figure 7 is a fragmentary longitudinal sectional view illustrating the condition of the parts when a tube is in an extreme angular position; and Figure 8 is a transverse sectional view taken substantially as indicated by line 8—8 on Figure 7 illustrating, in an exaggerated manner, the distortion of the coupling body and related tube.

The couplings of the invention are adapted to be employed to connect adjacent tubes provided with standard or special beads adjacent their ends and to connect such tubes with the bosses or like fittings of tanks, pumps, etc. In the drawings we have shown two typical forms and applications of the invention and where corresponding elements appear in the drawings corresponding reference numerals are applied thereto. In Figure 1 there is illustrated two adjacent lengths of tubing 10 provided near their ends with integral external annular beads 11. In accordance with the usual practice the beads 11 present curved external surfaces and are uniform in configuration throughout their circumference. In the particular application of the invention shown in Figure 1 the tubes 10 have thin or relatively thin walls and may be considered as being constructed of metal, plastic or other suitable material.

The coupling of the invention shown in Figure 1 may be said to comprise, generally, a coupling body 15, a split load assuming sleeve or collar 16 for cooperating with the beads 11 of the two tubes 10, sealing rings 17 for sealing between the internal surface of the body 15 and the external surfaces of the tubes 10 and a threaded external collar or nut 19 associated with the coupling body 15.

The coupling body 15 is a tubular member designed and proportioned to be readily slid or arranged around or over the tubes 10 and their beads 11. One end of the body 15 has an internal annular shoulder or flange 20 forming a stop or abutment for the internal elements of the coupling, as will later become apparent. The internal diameter of this flange 20 is greater than the external diameter of the beads 11 so that the flange does not interfere with the positioning of the body 15 on the tubing assembly. The end of the body 15 provided with the flange 20 may be slightly enlarged in external diameter, the opposite end portion of the body being provided with the externally arranged nut 19. In this connection it should be observed that the walls of the tubular coupling body 15 are relatively thin so as to be moderately flexible and capable of distortion.

The sleeve or collar 16 performs the important function of assuming the end loads imposed on the coupling by the internal fluid pressures in the tubing system as well as such loads imposed in other manners. The collar 16 is contained within the tubular coupling body 15 and cooperates with the beads 11 of the two tubes 10. The collar 16, which is illustrated in Figure 3 as well as in Figure 1, is an annular or tubular element having a substantially cylindrical periphery adapted to bear on the internal surface of the coupling body 15. Spaced internal annular shoulders or flanges 21 are provided on the collar 16 to engage with the beads 11. These flanges 21, which may preferably be integral with the collar 16 are preferably at the ends of the collar, as illustrated. The inner and outer radial sides or surfaces of the flanges 21 are preferably flat and occupy planes substantially normal to the central longitudinal axis of the coupling assembly. The inner corner of one flange 21 cooperates with the outer side or face of one bead 11 while the inner corner of the other flange 21 engages with the outer side of the other bead 11. In order to facilitate the assembling of the coupling and to allow the sleeve or collar 16 to conform to the body 15 during elastic deformation thereof the collar is split longitudinally as at 22. The split collar is sufficiently yieldable or flexible to be readily sprung over the tubes 10 and their beads 11. Thereafter, the coupling body 15 is slid over the collar 16 to restrain the collar against subsequent displacement so that the flanges 21 are retained in place to cooperate with their respective beads 11. While we have shown the collar 16 as a one-piece split member, it will be apparent that the collar may, if desired, be divided longitudinally or axially into two or more sections. As illustrated in Figure 1, the collar 16 is preferably proportioned and its flanges 21 are spaced so that the opposing ends of the tubes 10 are spaced apart slightly when the beads 11 are in cooperation with their respective flanges 21. The collar 16 is preferably formed of metal, such as steel, or other suitable relatively high strength material, and the flanges 21 of the collar cooperating with the spaced beads 11 of the two tubes 10 is dependable and effective in assuming all axial or end loads tending to separate the tubes. Thus, even in situations where the tubing is relatively large in diameter and carries fluid at high pressures, the collar 16 assumes all of the heavy "separating" loads to relieve other parts of the coupling of all such loading.

The seal rings 17 are provided in the coupling body 15 at each end of the sleeve or collar 16 and serve to prevent the passage or leakage of fluid under pressure from between the body 15 and the external surfaces of the tubes 10. In accordance with the broader aspects of the invention any appropriate type or form of packing or sealing rings may be employed, such as square or rectangular sealing rings, chevron type seals, etc. We have shown the sealing rings 17 in the form of what are generally known as O rings. These rings are formed of rubber, synthetic rubber, rubber composition, appropriate plastic, or the like, to have the selected or required hardness, resiliency, flexibility and other physical characteristics and are circular or round in transverse cross section. One ring 17 is arranged within the body 15 between a flange 21 of the collar 16 and a washer 23 engaged against the internal stop shoulder 20 of the body. The washer 23 serves to prevent excessive distortion or extrusion of the sealing ring 17 and is sectional or split to be readily sprung over the adjacent or related tubing bead 11. The other sealing ring 17 is positioned in the body 15 between the other collar flange 21 and a washer 24. The washer 24 is engaged or retained by the nut 19, to be subsequently described. As will be apparent the washer 24 serves to prevent excessive distortion and extrusion of the related or adjacent sealing ring 17. The washer 24 is split or sectional to be readily assembled around its related tube 10. In practice, the two washers 23 and 24 may be similar or identical and Figure 2 of the drawings illustrates the washer 23 constructed in two halves or sections joined or connected along the lines 18. We may prefer to provide tongue and groove connections 12 at the lines of connection 18. These tongue and groove connections 12 are preferably slightly "dovetailed" and such that the two halves or sections of the washer 23 may be readily snapped together by manual hand pressure to thereafter remain connected until deliberately disassembled. The washers 23 and 24 are proportioned to have little or no radial play or motion within the coupling body 15 but are adapted to conform to the body when the same is elastically deformed. The sealing rings 17 are proportioned to be under initial light compression between the internal surface of the body 15 and the external surfaces of the tube 10, the fluid pressure or leakage pressure usually acting to maintain effective service compression and actuation of the sealing rings. However, as will be described below, the nut 19 may be utilized to exert axial compression on the seal rings 17 if this is desired or found necessary. It is to be particularly noted that the sealing rings 17 are arranged and located beyond the ends of the collar 16 where they are not compressed or otherwise affected by any end loads tending to separate the tubes 10, these loads being directly and totally assumed by the collar 16.

The above mentioned nut 19 is threaded or screwed on one end portion of the tubular coupling body 15 and has a flange or internal lip 36 extending inwardly toward the related tube 10 beyond the end of the coupling body. It will be observed from an inspection of Figure 1 that the internal diameters of the body flange 20 and the lip 36 are considerably greater than the diameter of the tubes 10 and greater than the maximum external diameter of the beads 11. This relationship facilitates assembly of the coupling on the tubes and allows free angular movement of the tubes 10 relative to one another and relative to the coupling body 15. The circular or annular lip 36 of the nut 19 has an inturned annular part 27 for cooperating with the adjacent washer 24. If desired and when practical, this part 27 may be integral with the nut 19 and its lip 36. However, in other instances it is preferred to construct the part 27 as a separate member and then press or force fit an end of the same into an annular groove 28 in the inner face or side of the lip 36. It has been found that this manner of constructing the nut assembly is economical and facilitates the easy accurate cutting of the screw threads on the interior of the nut 19. As shown in Figure 1, the part 27 of the nut 19 bears against the adjacent washer 24, which, in turn, engages against the related sealing ring 17. By threading or tightening the nut 19 on the body 15 the two sealing rings 17 are simultaneously and substantially uniformly compressed between their related washers 23 and 24 and the end flanges 21 of the load assuming collar 16.

In the embodiment and application of the invention illustrated in Figures 4 to 8 inclusive of the drawings, the two tubes 30 may be considered as having thick or relatively thick walls and are provided adjacent their opposing ends with integral external beads 31. In this case the beads 31 present abrupt inner surfaces or sides for engagement by the load assuming sleeve or collar 16 of the coupling. The coupling of Figures 4 to 8 inclusive includes the tubular shell or body 15 engaging around the load carrying sleeve 16. The body 15 is provided at one end with an internal annular flange 20 and an external nut 39 is threaded on the other end portion of the body 15. As in the previously described form of the invention, the internal sleeve or collar 16 fits within the body 15 and is provided at its ends with the inturned annular flanges 21. The inner sides of these flanges 21 cooperate with the above mentioned flat faces of the tube beads 31 whereby the collar 16 is adapted to assume all axial loads tending to separate the tubes 30, thereby relieving the other parts of the coupling of such loading. The sealing rings 17 are arranged within the tubular coupling body 15 at the outer ends or faces of the collar flanges 21 to seal between the external surfaces of the tubes 30 and the internal surface of the tubular body. As in the previously described form of the invention the load assuming collar 16 is axially split to facilitate its assembly on the tubes. A washer 34, corresponding in function with the washer 23 above described, is arranged within the body 15 between flange 20 and the adjacent sealing ring 17. As illustrated in Figure 4 of the drawings, this washer 34 is split or constructed of two or more sections and has an annular groove 37 in its periphery. This groove 37 contains a ring 38 of wire, such as spring wire or piano wire, the wire being retained in the groove by crimping the sides of the groove as at 40. The wire 38 is split, extending for slightly less than 360° and is arranged so that its ends are adjacent a split 41 in the washer 34. This is illustrated in Figure 4. With this arrangement the wire 38 serves as a flexible internal hinge permitting ready opening or spreading of the washer 34 at the other line of division or split 41 thereof, thus facilitating the ready assembling of the washer around its respective tube 30.

The nut 39 of the coupling illustrated in Figures 4 to 8 inclusive of the drawings has an annular internal lip 46 corresponding in purpose with the above described lip 36. It will be seen from an inspection of Figure 5 that the internal diameters of the body flange 20 and this lip 46 are considerably greater than the external diameter of the tubes 30 to permit substantial relative angular movement between the tubes 30 and the coupling and the internal diameters of the flange 20 and lip 46 are greater than the external diameter of the beads 31, thus permitting ready assembly of the coupling on the tubes. A gland or follower 48 is arranged in the body 15 at the inner side of the lip 46 to engage or cooperate with the adjacent sealing ring 17. This follower 48 may be split at 49 to facilitate its assembly over the related beads 31 and is constructed to present a relatively broad inner surface for engagement with the adjacent sealing ring 17. It will be seen that the nut 39 may be threaded or screwed along the body 35 to provide the two sealing rings 17 with a desirable initial axial compression if this is desirable. The parts are constructed and related so that the sealing rings 17 are slightly compressed radially between the internal surface of the body 15 and the external surfaces of the tubes 30.

From the foregoing detailed description it will be seen that we have provided simple, effective and inexpensive tube couplings in which the axial or end forces developed by the pressures in the tubing system and by other means are entirely and dependably transmitted or carried by the sleeve or collar 16. The collar 16 has direct metal-to-metal engagement with the beads 11 and 31 to constitute a direct mechanical connection between the tubes. The sealing rings are not in any way influenced or affected by the axial or end loads thus taken by the sleeve or collar 16. The sealing rings may be mechanically actuated by operation of the nuts 19 or 39, however in most instances such mechanical actuation is not necessary to effect good fluid-tight seals. Where the couplings incorporate O sealing rings, the "leakage" fluid pressure acting against the sealing rings itself serves to actuate the rings to obtain and maintain sealing engagement of the sealing rings with the tubes and the coupling body 15. However, it should be observed that the sealing rings are not subjected to the fluid pressure acting across the entire cross sectional dimension of the coupling but are acted upon only by the fluid pressures in the annuluses occupied by the sealing rings themselves. Accordingly the sealing rings 17 are not subjected to excessive fluid pressures and are not liable to extrusion or excessive distortion by such pressures. Because the sealing rings 17 are contained or confined between the flanges 21 of the collar 16 and the related washers 23 and 24, or the equivalent, they are equally effective in preventing leakage where the tubing system is carrying fluid at positive pressures and negative pressures, that is under either superatmospheric pressure or subatmospheric pressure. As above described, the couplings of the invention are designed and constructed so that they may be easily and quickly assembled around the beaded tubing with a minimum of physical effort and no special tools or equipment are required in assembling or disassembling the couplings.

As described above, much difficulty has been encountered in maintaining fluid-tight seals in earlier couplings of this general class due to excessive squeezing or distortion of the sealing rings when one or both of the connected tubes are deflected or moved to angular positions with respect to the coupling assembly. The sealing rings when thus squeezed often retain their deformed configurations after the tubes are restored to more normal or in-line positions and the fluid under pressure within the system is free to leak past the deformed rings. Such leakage often occurs under low temperature conditions where the resiliency of the sealing rings is impaired and in installations where the character of the fluid being handled or other factors require the use of sealing rings constructed of material having poor or low resiliency. Similar leakage problems were common in the earlier couplings when used on thin-walled tubing which substantially deformed or deflected when moved to angular positions relative to the coupling body. In such cases the coupling bodies or assemblies of the earlier devices were rigid and did not conform to such deformation of the tubes with the result that the sealing rings were unevenly squeezed to sometimes permanently deform the tubes and when the tubes were restored to the more in-line positions the residual deformation of the sealing rings allowed the leakage of fluid, particularly when the rings were cold or constructed of materials having low or poor resiliency and if the tubes were permanently deformed leakage often resulted.

The couplings of the invention obviate these leakage problems. The coupling body 15 and its nut 19 or nut 39 are flexible or semi-elastic elements substantially conformable to the related tubes 10 and 30 to avoid excessive and unequal squeezing of the sealing rings 17 when the tubes are angularly displaced relative to the coupling. Thus, when the tubes 30 have thick or relatively thick walls and a tube 30 is moved to an extreme angular position, such as shown in Figure 7, the semi-elastic body 15 conforms to the configuration of the angularly displaced tube. Referring now to Figure 8, which is a cross sectional view taken in a plane normal to the central longitudinal axis of the displaced tube 30, the wall of the tubular body 15 is shown conforming substantially with the elliptical cross section of the tube, this conformance maintaining substantially uniform pressure or squeeze on the sealing ring 17 throughout the circumference of the ring and avoiding excessive distortion of the sealing ring at any point. The configurations in Figure 8 are somewhat exaggerated to better illustrate the action just described. A similar action takes place when the coupling is used on thin-walled tubing. In such situations the semi-elastic conformable body 15 of the coupling conforms with the external elliptical configuration of the angularly displaced tube 10 or 30, as viewed in the cross sectional plane of Figure 8, to maintain substantially uniform pressure on the sealing ring 17. This not only prevents excessive or unequal distortion of the sealing ring to prevent leakage or subsequent leakage but also avoids permanent deformation of the thin-walled tube which oftentimes occurred in the earlier couplings where the body was rigid and inelastic and where the thin-walled tube was obliged to bend and conform with the maintained cylindrical configuration of the coupling. It will be observed that the sleeve or collar 16, being split or sectional, in no way interferes with the above described elastic and conforming action of the coupling body. In a like manner the washers 23, 24 and 34 are split and "flexible" and the nuts 39 and 19 are made thin to flex or bend with the body.

Having described only typical forms of the invention we do not wish to be limited to the specific details herein set forth, but wish to reserve to ourselves any variations or modifications that may appear to those skilled in the art and fall within the scope of the following claim.

We claim:

A coupling for flexibly connecting and sealing with a pair of fluid conducting tubes arranged end to end with said ends in spaced relation to each other and having external beading adjacent said ends thereof, the external surfaces of the tubes being of uniform diameter beyond the distal sides of the beading comprising; means for transmitting axial loads from one tube to the other while allowing relative angular movement between the tubes including a collar encompassing said tube ends and said beading, and spaced flanges on the collar engaging the distal sides of said beading, said collar being axially inextensible whereby said engagement of the flanges with the beading prevents axial movement of said tubes away from one another, the collar and its flanges being clear and free of all external surfaces of the tubes except for said engagement of the flanges with the distal sides of the beading to allow said relative angular movement of the tubes and to allow axial movement of the tubes toward one another, the clearance between said beads and the inner surface of the said collar being substantially equal to one-half the radial height of said flange, a coupling body encompassing said collar and having integral end portions extending axially beyond the flanges of said collar, one of the integral end portions of said coupling body being radially inwardly flanged, the other integral end portion having threads and a radially inwardly flanged nut engaged thereupon, said flanged end portion and said nut supported on said other integral end portion being of substantially equal outer diameter, the thickness of the central portion of said coupling body intermediate the said end portions being substantially less than the thickness of the said end portions, said central portion having the same internal diameter as said end portions thus constituting a depression intermediate said end portions, annular sealing means engaging the inner surfaces of said coupling flanged end portions and the external surfaces of the tubes, said sealing means being arranged at the outer ends of said collar flanges and being yieldable to conform with the tubes upon angular displacement of the same, washers arranged between said sealing means and said coupling body flange and said nut flange, said coupling body including said end portions thereof being continuous in cross section so as to form with said sealing means and said tubes a sealed chamber which prevents the escape of fluid passing through said tubes, said coupling body and said collar being flexible to conform with the tubes when the tubes are angularly displaced relative thereto whereby, when flexing or bending pressure is exerted upon the tubes the angular displacement of the tubing with respect to the coupling body results in a pressure being exerted upon an area of a flange of said collar and simultaneously upon a diametrically opposed area of the adjacent washer and whereby the clearance between the tube beads and said collar member allows angular distortion of the tubes relative to the coupling members and said thin central portion of said coupling member enables the coupling to be ovularly distorted in substantially the same manner as the tubes and sealing rings are distorted, the seal thus remaining pressure tight over a wide range of flexure.

(References on following page)

References Cited in the file of this patent

UNITED STATES PATENTS

| | | |
|---|---|---|
| 944,877 | Koschinski | Dec. 28, 1909 |
| 1,622,768 | Cook | Mar. 29, 1927 |
| 2,426,423 | Woolsey | Aug. 26, 1947 |
| 2,497,441 | Detweiler | Feb. 14, 1950 |

FOREIGN PATENTS

| | | |
|---|---|---|
| 253,581 | Great Britain | June 16, 1926 |
| 459,883 | Italy | Oct. 6, 1950 |